(No Model.)
L. J. KNIGHT.
Fruit Gatherer.
No. 232,042. Patented Sept. 7, 1880.
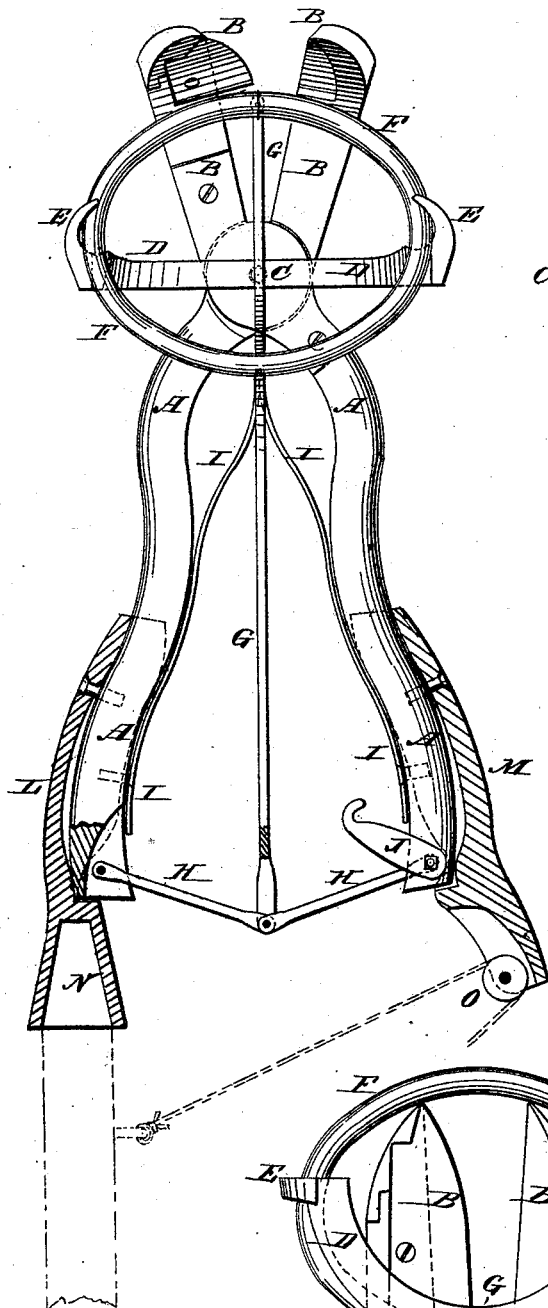
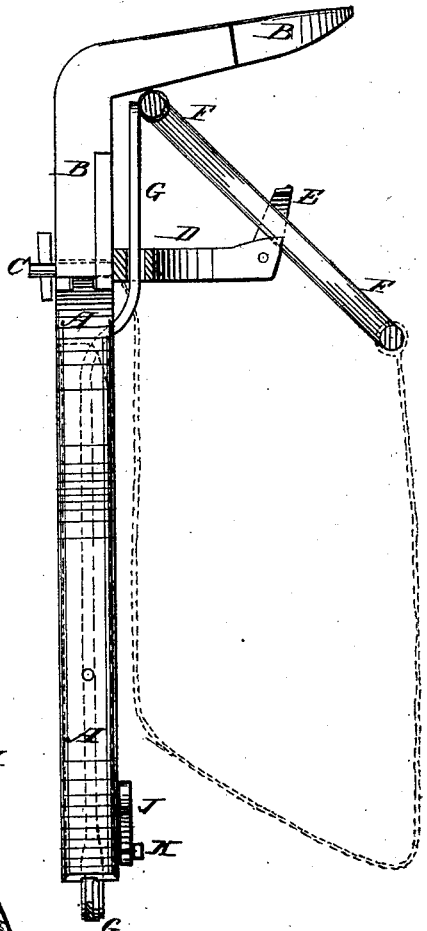
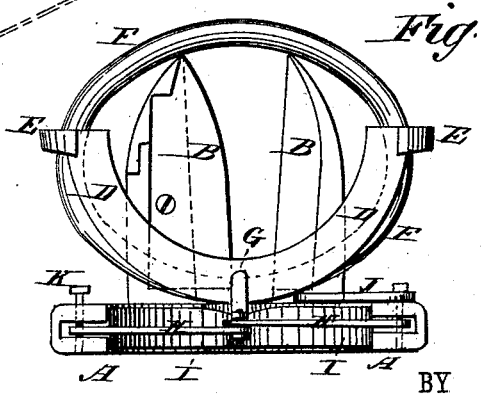
WITNESSES:
INVENTOR: L. J. Knight
BY Munn & Co.
ATTORNEYS.

UNITED STATES PATENT OFFICE.

LEVI J. KNIGHT, OF MANATEE, FLORIDA.

FRUIT-GATHERER.

SPECIFICATION forming part of Letters Patent No. 232,042, dated September 7, 1880.

Application filed April 16, 1880. (No model.)

*To all whom it may concern:*

Be it known that I, LEVI JONATHAN KNIGHT, of Manatee, in the county of Manatee and State of Florida, have invented a new and useful Improvement in Fruit-Gatherers, of which the following is a specification.

Figure 1 is a front elevation, partly in section, of the improvement. Fig. 2 is a side elevation, partly in section. Fig. 3 is a bottom view.

Similar letters of reference indicate corresponding parts.

The object of this invention is to furnish fruit-gatherers for gathering oranges and other fruit without bruising or injuring the fruit or trees.

A represents the handles of a pair of shears, which handles are pivoted to each other in the usual manner.

The blades B of the shears are bent forward at right angles, or nearly at right angles, as shown in Fig. 2, so that they can be readily passed between the fruit and the branch of the tree to cut the stem of the fruit.

Upon the head of the shears-pivot C is formed a half-ring, D, upon the upper side of the ends of which are formed hooks E, to receive and serve as fulcrums for the ring or hoop F.

To the inner part of the ring F is pivoted the end of a rod, G, which passes through a guide-hole in the pivot C, or the middle part of the half-ring D, and extends down a little below the ends of the handles A.

To the lower end of the rod G are pivoted the inner ends of two rods, H, the outer ends of which are pivoted to the lower ends of the handles A. The rods H are made of such a length that they will not come into line with each other, even when the shears are open to their full extent.

The shears are held open by springs I, interposed between and attached to the handles A.

The fruit when cut off is designed to be received in a bag or pouch attached to the half-ring D and to the outer part of the ring F.

With this construction, when the shears are opened, the rods H push the rod G upward, which raises the inner part of the ring F and lowers the outer part of the said ring, so that the fruit when the blades B are passed above it may pass in between the said blades B and the said outer part of the ring F.

As the shears are closed to cut the stem of the fruit the inward movement of the handles A causes the rods H to draw the rod G downward, which lowers the inner part of the ring F and raises the outer part of the said ring, so that when the stem is cut the fruit cannot escape between the blades B and ring F, but must drop into the pouch or bag.

The shears are held closed, when being carried and when not in use, by the hook J, pivoted to one of the handles A, and hooking upon a pin, K, attached to the other handle.

To adapt the implement for use in gathering fruit from high branches arms L M are attached to the handles A.

The inner sides of the upper ends of the arms L M are concaved to fit upon the outer sides of the handles A, where they are secured in place by screws.

In the lower end of the arm L is formed a socket, N, to receive the end of a pole, and in a recess in the lower end of the other arm, M, is pivoted a pulley, O, to receive a cord attached to the said pole, so that the implement may be operated from the ground to gather fruit from high branches.

Having thus fully described my invention, I claim as new and desire to secure by Letters Patent—

1. A fruit-gatherer constructed substantially as herein shown and described, consisting of the shears A B, having their blades bent forward at about a right angle, the half-ring D, having hooks E, the hinged ring F, the sliding rod G, the pivoted rods H, and the spring I, whereby the stem of the fruit can be cut and the fruit received in a pouch, as set forth.

2. In a fruit-gatherer, the shear-pivot C, hook-ended half-ring D E, and hoop F, combined with operative mechanism G H H, as and for the purpose specified.

LEVI JONATHAN KNIGHT.

Witnesses:
I. H. TUCKER,
M. A. MOORE.